(12) United States Patent
Jeong et al.

(10) Patent No.: US 9,466,844 B2
(45) Date of Patent: Oct. 11, 2016

(54) BLENDED RUBBER GASKET FOR FUEL CELLS

(71) Applicants: Hyundai Motor Company, Seoul (KR); Industrial Cooperation Foundation Chonbuk National University, Jeonju-Si, Jeollubk-Do (KR)

(72) Inventors: Byeong-Heon Jeong, Gyeonggi-Do (KR); Bo Ki Hong, Seoul (KR); Changwoon Nah, Jeollabuk-Do (KR); Yong Hwan Yoo, Ulsan (KR)

(73) Assignees: Hyundai Motor Company, Seoul (KR); Industrial Cooperation Foundation Chonbuk National University, Jeonju, Jeollabuk-do (KR)

( * ) Notice: Subject to any disclaimer, the term of this patent is extended or adjusted under 35 U.S.C. 154(b) by 101 days.

(21) Appl. No.: 14/313,238

(22) Filed: Jun. 24, 2014

(65) Prior Publication Data

US 2015/0188153 A1    Jul. 2, 2015

(30) Foreign Application Priority Data

Dec. 27, 2013    (KR) .................. 10-2013-0164904

(51) Int. Cl.
*H01M 8/02*        (2016.01)
*C08L 21/00*       (2006.01)
(Continued)

(52) U.S. Cl.
CPC ............ *H01M 8/0284* (2013.01); *C08L 21/00* (2013.01); *C08L 23/16* (2013.01); *H01M 8/0286* (2013.01); *H01M 2008/1095* (2013.01); *H01M 2250/20* (2013.01); *Y02E 60/50* (2013.01); *Y02P 70/56* (2015.11)

(58) Field of Classification Search
CPC ......... H01M 8/0284; H01M 2250/20; H01M 2008/1095; H01M 8/02; H01M 8/0286; C08L 23/16; C08L 21/00; Y02P 70/56; Y02E 60/50
USPC .......................................... 524/520; 525/199
See application file for complete search history.

(56) References Cited

U.S. PATENT DOCUMENTS

| 7,127,902 B1 | 10/2006 | Levy | |
| 2005/0221132 A1* | 10/2005 | Hirai | H01M 8/0284 429/100 |
| 2009/0162718 A1* | 6/2009 | Extrand | C08K 3/04 429/532 |

FOREIGN PATENT DOCUMENTS

| CN | 102115563 A | * 7/2011 |
| JP | H06305322 A | 11/1994 |

(Continued)

OTHER PUBLICATIONS

JP 2004-055428 A (2004), machine translation, JPO/INPIT Japan Platform for Patent Information (J-PlatPat).*

(Continued)

*Primary Examiner* — Susannah Chung
*Assistant Examiner* — Josephine Chang
(74) *Attorney, Agent, or Firm* — Mintz Levin Cohn Ferris Glovsky and Popeo, P.C.; Peter F. Corless (57) ABSTRACT

The present invention provides a blended rubber gasket for fuel cells that includes a base having about 80 to 99 phr of EPDM rubber and about 1 to 20 phr of FKM rubber, and about 0.1 to 10 phr of a peroxide crosslinking agent, based on 100 phr of the base.

6 Claims, 2 Drawing Sheets

(51) Int. Cl.
*C08L 23/16* (2006.01)
*H01M 8/10* (2016.01)

(56) References Cited

FOREIGN PATENT DOCUMENTS

| JP | H07-003100 | | 1/1995 |
|---|---|---|---|
| JP | H07198425 A | | 8/1995 |
| JP | 2003-157866 A | | 5/2003 |
| JP | 2004-055428 A | | 2/2004 |
| JP | 2004055428 A | * | 2/2004 |
| JP | 2005-181277 A | | 7/2005 |
| JP | 2005-348997 A | | 12/2005 |
| JP | 2006306942 A | * | 11/2006 |
| KR | 10-2001-0026803 A | | 4/2001 |
| KR | 10-2005-0119449 | | 12/2005 |
| KR | 10-2012-0023874 A | | 3/2012 |
| KR | 10-2012-0069094 A | | 6/2012 |

OTHER PUBLICATIONS

JP 2006-306942 A (2006), machine translation, JPO/INPIT Japan Platform for Patent Information (J-PlatPat).*
CN 102115563 A (2011), Derwent abstract, AN 2011-K04350, DW 201324.*
Seo, Kwan-ho et al., "The Study of Characteristics on EPDM, NBR, FKM, VMQ and FVMQ for Sealing Applications to Lithium Ion Battery", Elastomer and Composites, vol. 45, No. 3, pp. 212-216 (Sep. 2010).

* cited by examiner

BLENDED RUBBER GASKET FOR FUEL CELLS

CROSS-REFERENCE TO RELATED APPLICATION

This application claims under 35 U.S.C. §119(a) the benefit of Korean Patent Application No. 10-2013-0164904 filed on Dec. 27, 2013, the entire contents of which are incorporated herein by reference.

TECHNICAL FILED

The present invention relates to a blended rubber gasket for fuel cells, which is integrated with a membrane-electrode assembly (MEA), a gas diffusion layer (GDL), a separator or a polymer frame, as a component of a fuel cell stack, by an injection molding process. More particularly, the present invention relates to a blended rubber gasket for fuel cells prepared by co-crosslinking hydrocarbon-based rubber and fluorine-based rubber with a peroxide crosslinking agent, thereby reducing cost and improving both fuel cell sealing stability at low temperatures and long-term use stability at substantially high temperatures.

BACKGROUND

In a fuel cell stack for hydrogen-powered fuel cell vehicles, since a fuel cell stack has to be sealed against reaction gases (e.g., hydrogen/air or oxygen) and cooling water (e.g., coolant), each unit cell should have a gasket. Therefore, the gasket for a fuel cell stack requires having high elasticity and substantially low compression set in a suitable range of hardness and exhibit excellent mechanical properties, acid resistance, hydrolysis resistance, heat resistance and electrical insulation properties. In addition, the gasket must exhibit low diffusivity and permeability for reaction gases and cooling water, include none or a small amount of impurities causing catalyst poisoning to achieve high productivity and reduce a production cost.

Generally, for a rubber gasket for fuel cell stacks, fluoroelastomers, silicone elastomers and hydrocarbon elastomer are widely used. Fluoroelastomers are classified into FKM, FFKM and the like, according to American Society for Testing and Materials (ASTM) standards. Fluoroelastomers are attractive material since they show excellent elasticity, acid resistance, heat resistance and the like, and thus are stably used for a substantial period of time under the operating conditions of a hydrogen-powered fuel cell vehicle. However, fluoroelastomers are disadvantageous since they are poor in injection-moldability and cold resistance and are expensive, thus mass production thereof is restricted. Meanwhile, when the fluoroelastomer having excellent basic properties such as elasticity, heat resistance and the like, is crosslinked with peroxide, production cost increases, but airtightness may be secured even at a substantially low temperature of about −30° C. or lower.

However, since a fuel cell stack for fuel cell vehicles includes several hundreds of unit cells and each unit cell is provided with a gasket, the fluoroelastomer is not desirable since a substantial amount of expensive fluoroelastomer needs to be used for the purpose of improving cold resistance. Furthermore, the fluoroelastomer barely has elasticity at a temperature as low as about −40° C., although the fluoroelastomer has excellent cold resistance.

Silicone elastomers are classified into general silicone rubbers, for example, polydimethylsiloxane and the like; and modified silicon rubbers, for example, fluorosilicone and the like. Although solid-type silicone rubbers may be used, liquid-type silicone rubbers may be more frequently used because it is advantageous to precise injection molding. Generally, the liquid-type silicone rubbers have an advantage of exhibiting excellent injection moldability, but have a disadvantage by eluting silicone as an impurity and further cause poisoning of platinum catalyst and reducing fuel cell performance. Thus, they are not suitable for fuel cell applications.

Among hydrocarbon elastomers, ethylene-propylene diene monomer (EPDM) rubber, ethylene-propylene rubber (EPR), isoprene rubber (IR), isobutylene-isoprene rubber (IIR) and the like are frequently used. These hydrocarbon elastomers are advantageous due to their excellent airtightness even at a substantially low temperature of about −40° C. or lower and low cost. However, the hydrocarbon elastomers are disadvantageous in that they cannot be easily used at a high temperature of about 120° C. or higher due to insufficient mechanical properties and heat resistance. For example, their physical properties such as elasticity, oxidation resistance and the like are deteriorated at substantially high temperatures.

Generally, a conventional gasket for fuel cells is integrated with a membrane-electrode assembly, a gas diffusion layer, a separator or a polymer frame by an injection molding process, and is made of any one from a fluoroelastomer, a hydrocarbon elastomer and a silicone elastomer. However, as described above, a gasket made of a single material cannot secure long-term use stability at both substantially low temperatures and substantially high temperatures, so a gasket made of two or more kinds of materials has been considered.

For example, a gasket for fuel cells, which is integrated with a component of a fuel cell such as a separator or an electrolyte membrane, has been developed. In such gasket for fuel cells, a rubber material having substantially low gas permeability is used for sealing gas passage portions, and a rubber material having substantially high gas permeability is used for sealing cooling water passage portions. However, the manufacturing process may be complicated since two types of gasket materials are integrated with any one component of a fuel cell. Moreover, since each of the gasket materials has certain optimal molding and crosslinking condition, the two types of gasket materials do not sufficiently exhibit desired physical properties when they are prepared under the same molding and crosslinking conditions.

In another example, a gasket for fuel cells, which is integrated with a component of a fuel cell such as a separator, a gas diffusion layer or a membrane electrode assembly, has been developed. The gasket therein is made by combining at least two or more types of rubber or resinous materials, therefore resinous materials, therefore the gasket includes a first layer attached to the component and a second layer covering the first layer. However, since the different gasket materials of two types are integrated with any one component of a fuel cell, the interlayer of interfacial adhesion in the gasket may be problematic, especially, when the second layer is formed on the first layer by an injection molding process. In such case, since the flowability of a gasket material for the second layer on the surface of the first layer is low, it may be difficult to obtain satisfactory molded products and the two types of gasket materials may not sufficiently exhibit desired physical properties under the same molding and crosslinking conditions.

Meanwhile, in order to solve the problems occurring when two types of gasket materials are independently prepared and used together, a technique to blend different types of rubber materials using a crosslinking agent has been attempted. So far, in the manufacture of a blended rubber gasket for fuel cells, technologies of blending fluorocarbon rubber and silicone rubber have been generally used. However, technologies of blending fluorocarbon rubber and hydrocarbon rubber have hardly been developed yet.

It is to be understood that the foregoing description is provided to merely aid the understanding of the present invention, and does not mean that the present invention falls under the purview of the related art which was already known to those skilled in the art.

SUMMARY OF THE INVENTION

Accordingly, the present invention provides a technical solution to the above-mentioned problems. In particular, the present invention provides a blended rubber gasket for fuel cells, which is integrated with a membrane-electrode assembly (MEA), a gas diffusion layer (GDL), a separator or a polymer frame, as a component of a fuel cell stack, by an injection molding process. According to present invention, the blended rubber gasket for fuel cells may be prepared by co-crosslinking hydrocarbon-based rubber and fluorine-based rubber with a peroxide crosslinking agent, thereby reducing cost and improving both fuel cell sealing stability at substantially low temperatures and long-term use stability at high temperatures.

In one aspect of the present invention, a blended rubber gasket for fuel cells may include: a base including about 80 to 99 phr (parts per hundred rubber) of EPDM rubber and about 1 to 20 phr of FKM rubber, and about 0.1 to 10 phr of a peroxide crosslinking agent based on 100 phr of the base. In particular, the EPDM rubber and the FKM rubber may be co-crosslinked by the peroxide crosslinking agent. The EPDM rubber may include about 50 to 75 wt. % of ethylene and about 1 to 10 wt. % of a diene monomer based on the total amount of EPDM rubber. The FKM rubber may include about 60 to 75 wt. % of fluorine based on the total amount of FKM rubber.

The peroxide crosslinking agent may include at least one selected from the group consisting of dicumyl peroxide, 2,5-dimethyl-2,5-di(t-butylperoxy)hexane, di-(2-t-butylperoxyisopropyl)benzene, di-(2,4-dichlorobenzoyl) peroxide, di(4-methylbenzoyl) peroxide, t-butyl peroxybenzoate, dibenzoyl peroxide, 1,1-di-(t-butylperoxy)-3,3,5-trimethylcyclohexane, t-butyl cumyl peroxide, and di-t-butyl peroxide. The blended rubber gasket for fuel cells may further include at least one auxiliary substance selected from the group consisting of a co-crosslinking agent, a crosslinking accelerator, a reinforcing agent, an antioxidant, an antiaging agent, a release agent, a plasticizer, a processing aid, a coupling agent and a tackifier in an amount of about 0.1 to 10 phr based on 100 phr of the base. The blended rubber gasket for fuel cells may be integrated with a membrane-electrode assembly (MEA), a gas diffusion layer (GDL), a separator or a polymer frame of a fuel cell by an injection molding process.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Figure 1:
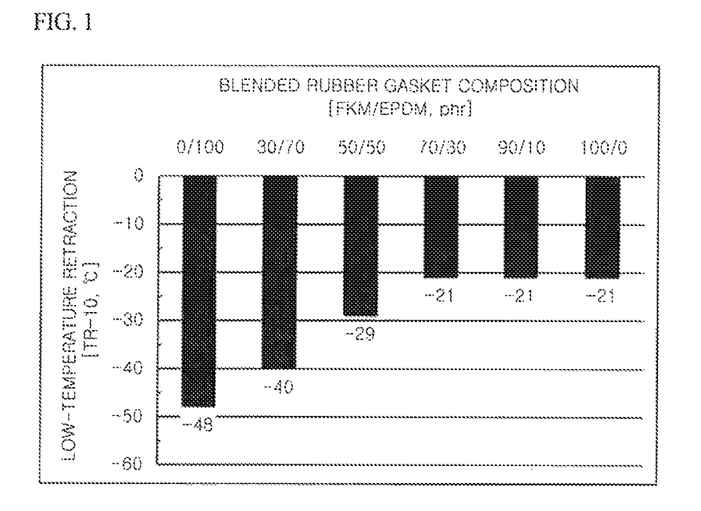
FIGS. 1 and 2 show exemplary test results from the analysis of low-temperature retraction characteristics of the blended rubber gaskets for fuel cells of Comparative Examples and Examples according to one exemplary embodiment of the present invention.
Figure 2:
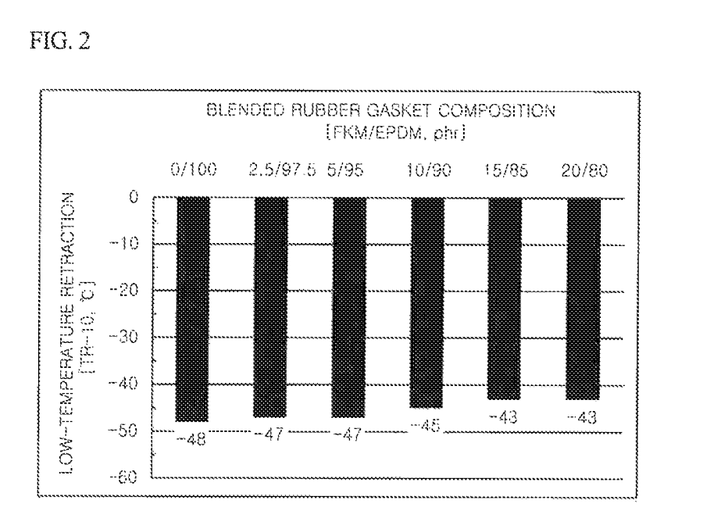
Figure 3:
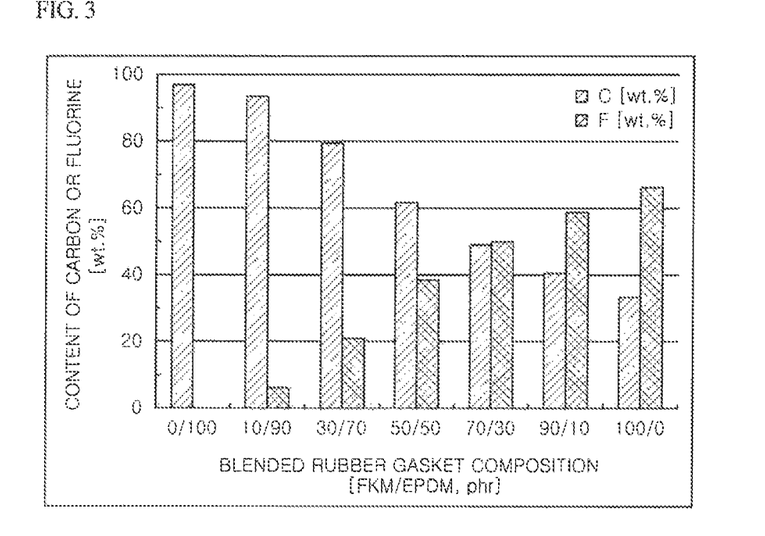
FIG. 3 is shows exemplary test results of EDX analysis of the blended rubber gaskets for fuel cells of Comparative Examples and Examples according to one exemplary embodiment of the present invention.

Hereinafter, exemplary embodiments of the present invention will be described in detail with reference to the attached drawings. FIGS. 1 and 2 show the test results from the analysis of low-temperature retraction characteristics of the blended rubber gaskets for fuel cells of Comparative Examples and Examples according to one exemplary embodiment of the present invention, and FIG. 3 shows the results of EDX (Energy Dispersive X-Ray Spectroscopy) analysis of the blended rubber gaskets for fuel cells of Comparative Examples and Examples according to one exemplary embodiment of the present invention.

The present invention relates a blended rubber gasket for fuel cells, which may be integrated with a membrane-electrode assembly (MEA), a gas diffusion layer (GDL), a separator or a polymer frame, as a component of a fuel cell stack, by an injection molding process. The present invention intends to solve the problems occurring when a gasket made of a single material is used. In one exemplary embodiment, the present invention provides a blended rubber gasket for fuel cells which may be prepared by co-crosslinking hydrocarbon-based rubber and fluorine-based rubber with a peroxide crosslinking agent, thereby reducing cost and improving both fuel cell sealing stability at low temperatures and long-term use stability at high temperatures.

A conventional fluorine-based, silicone-based or hydrocarbon-based gasket may not maintain airtightness and durability for the use of 10 years or more under a severe operating condition (e.g., −40 to 120° C.) of a hydrogen-powered fuel cell vehicle. Therefore, the present invention intends to provide a blended rubber gasket for fuel cells, wherein the blended rubber gasket may be manufactured by blending hydrocarbon rubber and fluorocarbon rubber, thereby obtaining improved cold resistance and price competitiveness of hydrocarbon rubber in addition to improved mechanical properties, elasticity and heat resistance of fluorocarbon rubber. In the conventional blended rubber gasket for fuel cells, phase separation may be unavoidable. Therefore, in the present invention, the dispersed phases of the blended rubber may be co-crosslinked by a peroxide crosslinking agent, thereby stabilizing the phases.

In order to satisfy improved cold resistance, price competitiveness, mechanical properties, heat resistance and the like, which are required properties for hydrogen-powered fuel cell vehicles, one exemplary embodiment of the present invention provides a blended rubber compound obtained by co-crosslinking EPDM rubber and fluorocarbon FKM rubber using a peroxide crosslinking agent. In conventional technologies, fluorine/acrylonitrile butadiene rubber, fluorine/acrylate rubber, fluorine-silicone rubber and EPDM/silicone rubber have been mixed, but required physical properties are not sufficiently obtained. Further, in the conventional technologies, the physical properties of a mixture of EPDM rubber and fluorocarbon rubber have been evaluated after crosslinking the mixture under a specific condition, but the mixture does not exhibit satisfactory performance because EPDM rubber and fluorocarbon rubber are not uniformly mixed. Therefore, when a peroxide crosslinking agent having excellent compatibility between EPDM rubber and fluorocarbon rubber is used, physical properties of the blended rubber compound are remarkably improved in various aspects.

In one exemplary embodiment, the blended rubber compound may include an EPDM rubber and a fluorocarbon rubber (FKM rubber) that may be co-crosslinked by a peroxide crosslinking agent, and may further include a reinforcing filler, such as carbon black, clay or the like; a co-crosslinking agent; a crosslinking accelerator, primary and secondary antioxidants; and a tackifier.

The EPDM rubber may be a ternary copolymer including, without limitation, ethylene, propylene and a diene monomer having a double bond. In particular, the content of ethylene may be about 50 wt. %, or about 50 to 75 wt. %; and the content of a diene monomer is about 1 to 10 wt. %, based on the total amount of EPDM rubber. This EPDM rubber is referred to as "a liquid or solid copolymer crosslinkable with peroxide". This EPDM rubber may improve cold resistance and price competitiveness of the blended rubber compound.

The FKM rubber, which is a hydrocarbon polymer having substantially high degree of fluorination, may be a binary or ternary copolymer of, without limitation, vinylidene fluoride (VDF), hexafluoropropylene (HFP), tetrafluoroethylene (TFE), perfluoromethyl vinyl ether (PMVE), perfluoroallkyl vinyl ether (PAVE) and the like as monomers. In particular, the FKM rubber may further include a cure site monomer, and may have a total fluorine content of 60 wt % or more, or about 60 to 70 wt. %, based on the total amount of FKM rubber. The FKM rubber is referred to as a liquid or solid copolymer that may be crosslinked with peroxide. This FKM rubber may improve mechanical property and heat resistance of the blended rubber compound.

The peroxide crosslinking agent, which functions to crosslink the EPDM rubber and FKM rubber with each other, and may include, without limitation, one or more selected from the group consisting of dicumyl peroxide having a purity of 90% or more, 2,5-dimethyl-2,5-di(t-butylperoxy)hexane, di-(2-t-butylperoxyisopropyl)benzene, di-(2,4-dichlorobenzoyl) peroxide, di(4-methylbenzoyl) peroxide, t-butyl peroxybenzoate, dibenzoyl peroxide, 1,1-di-(t-butylperoxy)-3,3,5-trimethylcyclohexane, t-butyl cumyl peroxide, and di-t-butyl peroxide.

The carbon black may enhance the hardness and mechanical properties of the blended rubber. In particular, the carbon black may have a grade of HAF (High Abrasion Furnace), FEF (Fast Extrusion Furnace), SAF (Super Abrasion Furnace), ISAF (Intermediate Super Abrasion Furnace), or GPF (General Purpose Furnace). In addition, the carbon black may have a particle diameter of about 10 to 500 nm. Layered clays may be independently used instead of carbon black, or may be used in combination with carbon black. Meanwhile, when the clay is used, a polyolefin-based polymer or hydrocarbon-based elastomer of which surface is modified with maleic anhydride may be mixed with the clay to increase the interlayer distance of the clay.

The co-crosslinking agent may increase crosslink density by accelerating crosslinkage for forming rubber blends and to decrease a compression set. In particular, acrylate having a purity of 90% or greater, methacrylate, vinyl ether, triallyl cyanurate (TAC), triallyl isocyanurate (TAIC) or the like may be used without limitation.

The antioxidant may be added to prevent the blended rubber for fuel cells from being oxidized and deteriorated by oxygen in the air and to inhibit the quality degradation thereof. Such an effect may be obtained by inhibiting a chain initiation step or chain propagation step in a radical reaction, which is deteriorative due to oxidation, or decomposition of peroxide. In this case, a radical scavenger and a peroxide decomposer may be used independently or in a mixture thereof.

The compound formulations and physical properties of the blended rubber gaskets for fuel cells of Comparative Examples 1 to 7 and Examples 1 to 5 are given in Table 1 below.

TABLE 1

Compound formulations and physical properties of blended rubber gaskets for fuel cells (Unit: phr)

| | Comp. Ex. | | | | | | | Ex. | | | | |
|---|---|---|---|---|---|---|---|---|---|---|---|---|
| | 1 | 2 | 3 | 4 | 5 | 6 | 7 | 1 | 2 | 3 | 4 | 5 |
| Components | | | | | | | | | | | | |
| EPDM | 100 | 70 | 50 | 30 | 20 | 10 | 0 | 97.5 | 95 | 90 | 85 | 80 |
| FKM-1 | 0 | 30 | 50 | 70 | 80 | 90 | 100 | 2.5 | 5 | 10 | 15 | 20 |
| Crosslinking agent | 3 | 3 | 3 | 3 | 3 | 3 | 3 | 3 | 3 | 3 | 3 | 3 |
| Carbon black | 5 | 5 | 5 | 5 | 5 | 5 | 5 | 5 | 5 | 5 | 5 | 5 |
| Co-crosslinking agent | 1 | 1 | 1 | 1 | 1 | 1 | 1 | 1 | 1 | 1 | 1 | 1 |

TABLE 1-continued

Compound formulations and physical properties of blended rubber gaskets for fuel cells
(Unit: phr)

|  | Comp. Ex. | | | | | | | Ex. | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Factors | | | | | | | | | | | | |
| Hardness (Durometer A) | 55 | 55 | 56 | 56 | 56 | 56 | 57 | 55 | 55 | 54 | 56 | 56 |
| Maximum tensile strength (MPa) | 2.9 | 5.4 | 8.5 | 8.8 | 8.2 | 18.7 | 21.7 | 3.8 | 3.6 | 5.0 | 3.8 | 5.3 |
| Elongation at break (%) | 176 | 254 | 318 | 344 | 455 | 460 | 499 | 164 | 185 | 236 | 198 | 244 |
| $t_s2$ (min) |  | 2.3 | 1.9 | 2.0 | 2.1 | 1.9 | 2.3 | 2.1 | 1.7 | 2.1 | 2.1 | 1.7 | 1.9 |
| t'90 (min) | 23.1 | 15.6 | 13.1 | 11.3 | 11.8 | 10.0 | 6.9 | 19.8 | 19.0 | 17.9 | 16.6 | 16.6 |
| Compression set (%, 72 h, 100° C.) | 3.5 | 6.0 | 9.2 | 16.6 | 16.7 | 17.8 | 28.0 | 4.1 | 4.2 | 4.9 | 5.6 | 5.9 |
| Compression set (%, 72 h, 150° C.) | N/A | 21.6 | 27.9 | 34.7 | 35.3 | 38.6 | 53.8 | 17.8 | 18.1 | 18.7 | 20.1 | 20.5 |
| TR-10 (° C.) | −48 | −40 | −29 | −21 | −21 | −21 | −21 | −47 | −47 | −45 | −43 | −43 |

The physical properties of the blended rubber gaskets for fuel cells of Comparative Examples 1 to 7 and Examples 1 to 5 according to one exemplary embodiment of the present invention were measured as follows.

1) Hardness: Shore A hardness was measured based on ASTM D2240.

2) Tensile property: Maximum tensile strength and elongation at break (i.e., the elongation at which rupture occurs) were measured based on ASTM D412.

3) Curing Property: A cure curve was measured using an oscillation disk rheometer (ODR) under the conditions of temperature 170° C., oscillation frequency 1.67 Hz for 60 min, based on ASTM D2084.

4) Compression set: A standard specimen was heat-treated at 100° C. for 72 hours, and then the compression set thereof was measured based on ASTM D395 (Method B, 25% Deflection).

5) Low temperature retraction: TR-10 was measured based on ASTM D1329.

Hereinafter, the blended rubber compounds used in the gasket for fuel cells according to one exemplary embodiment of the present invention are described in detail with reference to the following Comparative Examples 1 to 7 and Examples 1 to 5.

Comparative Examples 1 and 7

The EPDM rubber compound of Comparative Example 1, which uses EPDM rubber, includes: 100 phr of EPDM rubber including about 57 wt. % of ethylene and about 7.9 wt. % of a diene monomer and having a TR-10 value of −48° C.; 3 phr of a peroxide crosslinking agent; about 1 phr of a co-crosslinking agent; and about 5 phr of carbon black. The primary mixing procedure of these components was carried out at a rotor speed of 40 to 50 rpm using a Banbury mixer (Namyang Co., Ltd., Korea). First, EPDM rubber was masticated for 2 minutes, and was then mixed with carbon black at a temperature of 140° C. or lower to obtain a first mixture. Subsequently, the secondary mixing procedure was carried out using a two-roll mixer (DS-1500R, Withlab Co., Ltd., Korea). In other words, a peroxide crosslinking agent and a co-crosslinking agent were finally mixed with the first mixture for 20 minutes to prepare an EPDM rubber compound. The prepared EPDM rubber compound was aged at room temperature for about 24 hours, and then the cross-linking characteristics thereof were evaluated using ODR (Oscillating Disk Rheometer, Alpha Technologies). Specifically, a specimen for measuring mechanical properties and a specimen for measuring a compression set were fixed in a mold having a size of 150 mm×150 mm×2 mm and a standard mold based on ASTM D295, respectively, by a hydraulic press, and were then crosslinked at 170° C. for optimum crosslinking time (t': 90 min) to prepare a final rubber specimen, and then all the physical properties of the prepared rubber specimen were evaluated.

The EPDM rubber compound of Comparative Example 7, which uses ternary FKM-1 rubber composed of hexafluoropropylene, vinylidene fluoride and tetrafluoroethylene, includes: 100 phr of ternary FKM-1 rubber including about 68 wt. % of fluorine and having a TR-10 value of −21° C.; 3 phr of a peroxide crosslinking agent; 1 phr of a co-crosslinking agent; and 5 phr of carbon black. The FKM-1 rubber compound of Comparative Example 7 was prepared under the same conditions as for Comparative Example 1.

Comparative Examples 2 to 6

Each of the blended rubber gaskets of Comparative Examples 2 to 6 includes: about 10 to 70 phr of EPDM rubber including about 57 wt. % of ethylene and about 7.9 wt. % of a diene monomer, and about 90 to 30 phr of ternary FKM-1 rubber including about 68 wt. % of fluorine and having a TR-10 value of −21° C. Each of the blended rubber gaskets of Comparative Examples 2 to 6 was obtained by co-crosslinking 100 phr of the EPDM rubber and FKM-1 rubber with about 3 phr of a peroxide crosslinking agent. The amounts of a co-crosslinking agent and carbon black were about the same as those in Comparative Examples 1 and 7. The primary mixing procedure of these components was carried out at a rotor speed of about 40 to 50 rpm using a Banbury mixer. First, EPDM rubber was masticated for 2 minutes, FKM-1 rubber was mixed with the masticated EPDM rubber for 3 minutes, and then carbon black was added to the mixture at a temperature of 140° C. or lower. Subsequently, the secondary mixing procedure was carried out using a two-roll mixer. In other words, a peroxide crosslinking agent and a co-crosslinking agent were finally mixed with the mixture for 20 minutes to prepare a blended rubber compound. The specimens of the blended rubber compound were fabricated under the same conditions as for Comparative Example 1, and the physical properties thereof are given in Table 1 above.

Examples 1 to 5

Each of the blended rubber gaskets of Examples 1 to 5 includes: about 80 to 97.5 phr of EPDM rubber including about 57 wt. % of ethylene and about 7.9 wt. % of a diene monomer, and about 20 to 2.5 phr of ternary FKM-1 rubber including about 68 wt. % of fluorine and having a TR-10 value of −21° C. Each of the blended rubber gaskets of Examples 1 to 5 was obtained by co-crosslinking 100 phr of the EPDM rubber and FKM-1 rubber with about 3 phr of a peroxide crosslinking agent. The amounts of a co-crosslinking agent and carbon black were about the same as those in Comparative Examples 2 to 6. The blended rubber compounds of Examples 1 to 5 were prepared under the same conditions as for Comparative Examples 2 to 6, and the physical properties thereof are given in Table 1 above.

The evaluation results of physical properties for the blended rubber gaskets of Comparative Examples 1 to 7 and Examples 1 to 5 are described as follows.

Hardness

For a gasket of a fuel cell stack, to maintain the intimate contacts and airtightness between several hundreds of cells constituting a fuel cell stack, hardness may be substantially uniformly adjusted. When a blended rubber having a substantially high Shore A hardness of 65 or greater is used, it may be difficult to secure airtightness. Further, when a blended rubber having a Shore A hardness of 35 or less is used, crosslink density may decrease below a desired level. Therefore, since the elasticity of a gasket decreases and the compression set thereof inversely proportional to elasticity increases at an optimum level or greater, the excessive compression of unit cells may occur due to low hardness. Therefore, a blended rubber having a Shore hardness of about 35 to 65 may be used for a gasket of a fuel cell stack. In Comparative Examples 1 to 7 and Examples 1 to 5, EPDM rubber and FKM rubber, each having a Shore hardness of about 55 to 60, were selected, a blended rubber compound having a Shore hardness of about 55 was prepared, and then other physical properties and performance thereof were measured and compared.

Mechanical Property

As described above, it is advantageous in terms of durability improvement that a material having improved mechanical properties is used for a gasket of a fuel cell stack even though the material has the same hardness. Tensile test is necessary for determining the characteristics of a rubber material used as an index for determining the optimum crosslinking condition of non-crosslinked rubber, and is one of the most basic test factors in the evaluation of crosslinked rubber. The measurements of the maximum tensile strength and elongation at break of Examples 1 to 5 and Comparative Examples 1 to 7 are shown in Table 1. From the test results, the maximum tensile strength and elongation at break of the blended rubber gaskets of Examples 1 to 5 and Comparative Examples 1 to 7 are improved compared to when only EPDM rubber is used. Therefore, when FKM rubber having improved mechanical properties is blended with EPDM rubber, the disadvantage such as poor mechanical properties of EPDM rubber may be compensated with the blended rubber gasket of the present invention.

Curing Property

For a gasket of a fuel cell stack, to integrate the gasket with a membraneelectrode assembly, a gas diffusion layer or a separator, a blended rubber compound may be formed into a thin-film gasket by injection molding and primary crosslinking, and subsequently the thin-film gasket may pass through a post curing process for sufficient elasticity. Therefore, a suitable crosslinking rate may be maintained when the thin-film gasket is injection-molded in a mold. The crosslinking rate at the time of actual injection molding of a gasket compound may be tested using an ODR method. In the ODR method, the scorch time ($t_s2$) is referred to a phenomenon where the fluidity of the gasket compound is deteriorated by a crosslinking reaction before the completion of molding. In particular, the scorch time ($t_s2$) may be about 1.5 to 2.5 minutes. When the scorch time is less than 1.5 minutes, the injection-moldability of the gasket compound may deteriorate due to the excessive precuring thereof. Further, when the scorch time is greater than 2.5 minutes, the production cycle time of a gasket may increase. As shown in Table 1 above, the scorch time of the blended rubber compounds of Comparative Examples 1 to 7 and Examples 1 to 5 is about 2.0 minutes, which is suitable. Further, in the 90% cure time (t' 90) necessary for setting the post curing conditions, the t' 90 value of the blended rubber compounds of Examples 1 to 5 is between that of EPDM rubber and that of FKM rubber, and when the t' 90 value thereof is 16 to 20 minutes, each of the blended rubber compounds may have sufficient elasticity.

Compression Set

For a gasket of a fuel cell stack, a great compressive load is applied to the gasket when several hundreds of unit cells are compressed by a predetermined compressive load. Therefore, the elasticity of a gasket, which means the repellency of a gasket to compression, is an important evaluation factor. To test the elasticity of a gasket, a compression set test is generally performed. Considering that the lifetime of a vehicle is about 10 years, a gasket for a fuel cell stack should maintain sufficient elasticity for about 87,000 hours or more with it compressed, and thus the gasket may have a substantially low compression set. For example, the gasket may have a compression set of about 5% or less when it is tested at 100° C. for about 72 hours. Further, the gasket may have a compression set of 20% or less when it is tested under a severe condition of 150° C. for about 72 hours. As shown in Table 1 above, when Examples 1 to 5 were measured after being maintained at 100° C. for about 72 hours, the compression set of each of the blended rubber compounds of Examples 1 to 5 was greater than that of EPDM rubber, but was lower than that of FKM rubber or those of the blended rubber compounds of Comparative Examples 1 to 7.

A conventional polymer electrolyte membrane fuel cell stack is generally operated at a substantially low temperature range of about 55 to 75° C., but is required to operate at a substantially high temperature range of about 75 to 95° C. to improve the fuel efficiency thereof. Further, with the increase in the operation temperature of the fuel cell stack, a gasket used in peripheral parts of the fuel cell stack is also required to have higher heat resistance. When a rubber elastomer is exposed to air and oxygen at high temperatures, its physical properties are apt to be deteriorated by oxidation.

To overcome the above problem, FKM rubber having excellent heat resistance may be blended with EPDM rubber. As given in Table 1 above, the specimen with only EPDM rubber was damaged during a test for maintaining the specimen at 150° C. for about 72 hours because of insufficient heat resistance. To the contrary, the specimens of EPDM/FKM blended rubbers were not damaged, and were normally tested. Consequently, the blended rubber compound according to one exemplary embodiment of the present invention has a suitable compression set of about 20% or less.

From the above results, the EPDM/FKM blended rubber has improved elasticity even at high temperatures. Particularly, when this EPDM/FKM blended rubber is applied to a gasket for a fuel cell stack, the operation range of the fuel cell stack may be extended and the airtightness and durability thereof may be improved. Therefore, when FKM rubber having excellent heat resistance is blended with EPDM rubber, the disadvantage of EPDM rubber at substantially high temperatures may be overcome by one of the advantages of the blended rubber gasket according to the present invention.

Low Temperature Retraction

Generally, rubber exhibits elasticity at room temperature or higher. However, in lowered temperature, the elasticity is gradually reduced, and is completely lost at certain predetermined temperature or lower. For a gasket of a fuel cell stack, substantially low temperature operating condition in cold areas needs to be considered as well as the above-mentioned substantially high operation temperature. In the overall physical properties of a gasket considered above, FKM rubber has the most improved physical properties and highest reliability, but may not be widely used due to insufficient cold resistance. That is, it is required to develop a blended material having both improved high-temperature oxidation resistance and improved low-temperature retraction.

FIGS. 1 and 2 show the results of evaluating the low-temperature retraction (TR-10) of the EPDM/FKM blended rubber compounds of Comparative Examples 1 to 7 and Examples 1 to 5 according to one exemplary embodiment of the present invention. As shown in FIGS. 1 and 2, when the blended rubber gasket of the present invention is used, the reaction gas and cooling medium charged in the fuel cell stack may be sufficiently sealed even under an ultralow-temperature environment of about −40° C. or lower. Thus, when EPDM rubber having improved cold resistance is blended with FKM rubber, the disadvantage such as poor low-temperature stability of FKM rubber may be compensated with one of the merits of the blended rubber gasket of the present invention.

Combining all the above-mentioned results of evaluating the blended rubber compounds, the blended rubber compound may include about 80 phr or greater of EPDM rubber and about 20 phr or less of FKM rubber. When the amount of EPDM rubber is less than about 80 phr, the blended rubber compound may obtain sufficient mechanic properties, but the compression set thereof may increase. Further, when the amount of FKM rubber is greater than about 20 phr, the compression set of the blended rubber compound increases, and particularly, when the amount thereof is greater than about 50 phr, the TR-10 value of the blended rubber compound is −30° C. or greater, and thus the blended rubber compound has insufficient low-temperature elasticity. Therefore, when the target sealing temperature of a fuel cell stack is less than −40° C., the amount of FKM rubber in the blended rubber compound may be about 20 phr or less.

In Comparative Examples 1 to 7 and Examples 1 to 5, the amount of a peroxide crosslinking agent included in the blended rubber compound was about 3 phr. In particular, the amount of the peroxide crosslinking agent is about 0.1 to 10 phr, or about 0.5 to 5 phr, based on 100 phr of blended rubber. When the amount of the peroxide crosslinking agent is less than about 0.1 phr, FKM rubber and EPDM rubber may not be sufficiently crosslinked, and thus the mechanical properties, elasticity and the like of the finally obtained bled rubber compound may not be satisfactory (e.g., sufficiently improved). Meanwhile, when the amount thereof is greater than about 10 phr, FKM rubber and EPDM rubber may be sufficiently crosslinked, but non-reacted crosslinking agent or components remain in the blended rubber compound, and these non-reacted components may be slowly eluted during use as a secondary pollution source, thereby contaminating peripheral parts.

FIG. 3 shows the results of EDX element analysis of the blended rubber compounds of Comparative Examples and Examples of the present invention. As shown in FIG. 3, as the content of FKM rubber increases, the amount of carbon (C) in the blended rubber gasket decreases and the amount of fluorine (F) in the blended rubber gasket increases. From these results, the blending of EPDM rubber and FKM rubber was sufficiently performed according to the composition ratio of FKM/EPDM.

The components and physical properties of other blended rubber compounds of Comparative Examples 1 to 7 and Example 1 to 5 are given in Table 2 below. In each of the other blended rubber compounds, the same EPDM rubber was used; as the FKM rubber, ternary FKM-2 rubber having peroxide crosslinking sites, including about 64 wt. % of hexafluoropropylene, vinylidene fluoride and tetrafluoroethylene and having a TR-10 value of −31° C. was used. The amounts of carbon black and a co-crosslinking agent are about the same as the above-mentioned amounts. The other blended rubber compounds were prepared under the same conditions as those given in Table 1 above. As results, the mechanical properties, curing property, compression set and low-temperature retraction of the blended rubber compounds in Table 2 are similar to those given in Table 1 above.

TABLE 2

Compound formulations and physical properties of blended rubber gaskets for fuel cells
(Unit: phr)

| | Comp. Ex. | | | | | | | Ex. | | | | |
| --- | --- | --- | --- | --- | --- | --- | --- | --- | --- | --- | --- | --- |
| | 1 | 2 | 3 | 4 | 5 | 6 | 7 | 1 | 2 | 3 | 4 | 5 |
| Components | | | | | | | | | | | | |
| EPDM | 100 | 70 | 50 | 30 | 20 | 10 | 0 | 97.5 | 95 | 90 | 85 | 80 |
| FKM-2 | 0 | 30 | 50 | 70 | 80 | 90 | 100 | 2.5 | 5 | 10 | 15 | 20 |
| Crosslinking agent | 3 | 3 | 3 | 3 | 3 | 3 | 3 | 3 | 3 | 3 | 3 | 3 |
| Carbon black | 5 | 5 | 5 | 5 | 5 | 5 | 5 | 5 | 5 | 5 | 5 | 5 |
| Co-crosslinking agent | 1 | 1 | 1 | 1 | 1 | 1 | 1 | 1 | 1 | 1 | 1 | 1 |

TABLE 2-continued

Compound formulations and physical properties of blended rubber gaskets for fuel cells
(Unit: phr)

| | Comp. Ex. | | | | | | | Ex. | | | | |
|---|---|---|---|---|---|---|---|---|---|---|---|---|
| | 1 | 2 | 3 | 4 | 5 | 6 | 7 | 1 | 2 | 3 | 4 | 5 |
| Factors | | | | | | | | | | | | |
| Hardness (Durometer A) | 55 | 50 | 52 | 52 | 53 | 53 | 53 | 53 | 54 | 55 | 54 | 55 |
| Maximum tensile strength (MPa) | 2.9 | 6.1 | 6.7 | 7.0 | 7.5 | 8.0 | 18.9 | 3.6 | 3.6 | 3.6 | 3.7 | 4.1 |
| Elongation at break (%) | 176 | 311 | 342 | 373 | 402 | 423 | 495 | 168 | 176 | 189 | 198 | 219 |
| $t_s2$ (min) | 2.3 | 2.0 | 1.7 | 1.6 | 1.6 | 1.9 | 1.7 | 2.2 | 2.1 | 2.0 | 2.0 | 1.9 |
| t'90 (min) | 23.1 | 15.0 | 12.7 | 10.1 | 8.3 | 7.5 | 4.4 | 20.8 | 19.3 | 18.0 | 17.2 | 16.2 |
| Compression set (%, 72 h, 100° C.) | 3.5 | 7.4 | 14.5 | 17.3 | 19.2 | 21.4 | 26.4 | 3.6 | 3.9 | 4.3 | 5.6 | 5.4 |
| Compression set (%, 72 h, 150° C.) | N/A | 24.4 | 30.6 | 36.5 | 36.8 | 37.0 | 37.1 | 17.4 | 17.7 | 19.6 | 21.7 | 21.8 |
| TR-10 (° C.) | −48 | — | — | — | — | — | −31 | −48 | −48 | −47 | −45 | −45 |

As described above, the maximum tensile strength and elongation at break according to the blended rubber gasket for fuel cells of the present invention are improved compared to when only EPDM rubber is used. Particularly, when FKM rubber having improved mechanical properties is blended with EPDM rubber, the disadvantage, such as poor mechanical properties of EPDM rubber, may be compensated with one of the merits of the blended rubber gasket of the present invention.

Further, according to the blended rubber gasket for fuel cells of the present invention, the EPDM/FKM blended rubber has excellent elasticity even at substantially high temperatures. When this EPDM/FKM blended rubber is applied to a gasket for a fuel cell stack, the operation range of the fuel cell stack may be extended, and the airtightness and durability thereof may be improved. Therefore, when FKM rubber having excellent heat resistance is blended with EPDM rubber, the disadvantage of EPDM rubber, such as limited use of EPDM rubber at substantially high temperatures, may be overcome with one of the advantages of the blended rubber gasket of the present invention.

Additionally, according to the blended rubber gasket for fuel cells of the present invention, when the blended rubber gasket of the present invention is used, the reaction gas and cooling medium charged in the fuel cell stack may be sufficiently sealed even under an ultralow-temperature environment of −40° C. or lower. Particularly, when EPDM rubber having excellent cold resistance is blended with FKM rubber, the disadvantage, such as poor low-temperature stability of FKM rubber, may be compensated with one of the merits of the blended rubber gasket of the present invention. Therefore, the blended rubber gasket of the present invention may exhibit the above-mentioned various excellent multi-purpose properties, thereby further increasing the commodity value of a hydrogen-powered fuel cell vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A blended rubber gasket for fuel cells, comprising:
a base including 95 to 99 parts per hundred rubber (phr) of ethylene propylene diene monomer (EPDM) rubber and 1 to 5 phr of FKM rubber; and
0.1 to 5 phr of a peroxide crosslinking agent,
based on 100 phr of the base,
wherein the EPDM rubber and FKM rubber are co-crosslinked by the peroxide crosslinking agent,
wherein a compression set of co-crosslinked EPDM rubber and FKM rubber heat-treated at 100° C. for 72 hours is 4.2% or less, heat-treated at 150° C. for 72 hours is 18.1% or less, as measured according to ASTM D395 (Method B, 25% Deflection).

2. The blended rubber gasket for fuel cells of claim 1, wherein the EPDM rubber includes 55 to 60 wt. % of ethylene and to 10 wt. % of a diene monomer, based on the total amount of EPDM rubber.

3. The blended rubber gasket for fuel cells of claim 1, wherein the FKM rubber includes 60 to 70 wt. % of fluorine, based on the total amount of FKM rubber.

4. The blended rubber gasket for fuel cells of claim 1, wherein the peroxide crosslinking agent includes at least one selected from the group consisting of: dicumyl peroxide, 2,5-dimethyl-2,5-di(t-butylperoxy)hexane, di-(2-t-butylperoxyisopropyl)benzene, di-(2,4-dichlorobenzoyl) peroxide, di(4-methylbenzoyl) peroxide, t-butyl peroxybenzoate, dibenzoyl peroxide, 1,1-di-(t-butylperoxy)-3,3,5-trimethylcyclohexane, t-butyl cumyl peroxide, and di-t-butyl peroxide.

5. The blended rubber gasket for fuel cells of claim 1, further comprising at least one auxiliary substance selected from the group consisting of: a co-crosslinking agent, a crosslinking accelerator, a reinforcing filler, an antioxidant, an antiaging agent, a release agent, a plasticizer, a processing aid, a coupling agent and a tackifier in an amount of 0.1 to 10 phr, based on 100 phr of the base.

6. The blended rubber gasket for fuel cells of claim 1, wherein the blended rubber gasket is integrated with a membrane-electrode assembly (MEA), a gas diffusion layer (GDL), a separator or a polymer frame of a fuel cell by an injection molding process.

* * * * *